United States Patent [19]

Hurst

[11] Patent Number: 4,656,520
[45] Date of Patent: Apr. 7, 1987

[54] FRAME-TRANSFER CCD IMAGER WITH RECIRCULATING FRAME STORAGE REGISTER

[75] Inventor: Robert N. Hurst, Cherry Hill, N.J.

[73] Assignee: RCA Corporation, Princeton, N.J.

[21] Appl. No.: 755,681

[22] Filed: Jul. 16, 1985

[51] Int. Cl.$^4$ .............................................. H04N 3/14
[52] U.S. Cl. ................................................... 358/213
[58] Field of Search ................ 358/213, 212, 909, 335

[56] References Cited

U.S. PATENT DOCUMENTS

| | | | |
|---|---|---|---|
| 3,856,989 | 12/1974 | Weimer | 358/213 |
| 4,263,623 | 4/1981 | Woo et al. | 358/909 |
| 4,553,167 | 11/1985 | Kinoshita | 358/213 |

Primary Examiner—Gene Z. Rubinson
Assistant Examiner—Stephen Brinich
Attorney, Agent, or Firm—A. L. Limberg; L. C. Edelman; P. M. Emanuel

[57] ABSTRACT

A CCD imager of frame-storage type has a frame storage register operable as a recirculating serial memory. The output ends of the parallel charge transfer channels in the image register are separated from respective ones of the input ends of the parallel charge transfer channels in the frame storage register by respective ones of the successive charge transfer stages of a line register. After the frame storage register charge packet contents are converted to serial format and sensed during selected field scan intervals, corresponding charge packets are clocked serially into the line register, then parallelly entered into the frame storage register.

19 Claims, 11 Drawing Figures

FRAME-TRANSFER CCD IMAGER WITH RECIRCULATING FRAME STORAGE REGISTER

The present invention relates to frame-transfer CCD imagers and, more particularly, to ones improved in that pixel intensity information is read from the frame storage register and is then re-written into the frame storage register to be read again.

BACKGROUND OF THE INVENTION

In the prior art, frame-transfer CCD imagers may in actuality be field-transfer imagers where a single frame of video signal samples consists of a plurality of interlaced fields of video signal samples rather than a single non-interleaved field of video signal samples. In this background of invention it will be assumed each frame is a single non-interlaced field, so that field and frame are synonymous, unless specification to the contrary is explicitly made.

A frame-transfer CCD imager comprises an image (or A) register, a frame storage (or B) register and an output line (or C) register. The image register is a plurality of CCD charge transfer channels disposed in parallel array in a surface of a semiconductive substrate. These charge transfer channels lie under gate electrodes to which static clocking signals are supplied during image integration times, when a radiant energy image is projected into the portion of the semiconductor substrate in which the parallel array of charge transfer channels is disposed. The radiant energy image generates charge carriers in a photoconversion process taking place in the image register portion of the semiconductor substrate, and these charge carriers are collected into charge packets in respective charge transfer stages of the CCD charge transfer channels of the image register, as defined by the static clocking signals. Conventionally, the image integration time extends over field trace intervals (or portions of them) in the raster-scanned video signa generated from the frame-transfer CCD imager output samples.

Frame transfer times intervene between successive integration times. These frame transfer times occur during the field retrace intervals of the rasterscanned video signal generated from the CCD imager output signal samples. During frame transfer times, the gate electrodes overlying the parallel array of CCD charge transfer channels have dynamic clocking signals applied to them. This causes the transfer of successive rows of charge packets from the output ends of the CCD charge transfer channels in the image register to the input ends of CCD charge transfer channels in the frame-storage register.

The frame-storage register comprises a plurality of CCD charge transfer channels disposed in parallel array on the semiconductive substrate. During a field transfer time the gate electrodes overlying these charge transfer channels, like the gate electrodes overlying the charge transfer channels of the image register, have dynamic clocking signal voltages applied to them that change at relatively fast clock rate applied to them. So all the charge packets descriptive of the energies of respective radiant energy image elements, which had been accumulated in the image register during the previous image integration time, are transferred to respective charge transfer stages in the frame-storage register.

During the succeeding field trace interval, the frame-storage register is forward clocked at relatively slow clock rate to advance rows of charge packets in its charge transfer channels, by one charge transfer stage each line retrace interval. The row of charge packets transferred from the output ends of the charge transfer channels of the frame-storage register load, in parallel, the successive charge transfer stages in the output line register. During line retrace intervals the output line register is operated as a CCD shift register clocked at pixel scan rate to deliver the row of charge packets serially to a charge sensing stage. The charge sensing stage generates samples of a raster-scanned video signal responsive to respective ones of these charge packets.

The transfer of rows of charge packets from the image register of a frame-transfer type imager to its frame-storage register by transferring each row of charge packets in parallel, from the output ends of the charge transfer channels in the image-register into the successive charge transfer stages of a further CCD line register, and thence into the input ends of the charge transfer channels in the frame storage register has been previously described by others. Those persons who have used a further CCD line register between the image register and frame storage registers have (as far as is known by the inventor) used it as an output line register. This further output line register permits scanning the image field in reverse line order, for example.

This further output line register has also been used to read out a row of charge packets descriptive only of transfer smear as generated by overclocking lhe image register, or of a row of charge packets descriptive only of transfer smear plus dark current as generated in a portion of the image register masked from irradiation of the radiant energy image. This has been done as a preliminary step in arrangements for compensating against transfer smear in the imager output signal.

At a time before dynamic metal-oxidesemiconductor transistor memories were perfected, CCD arrays were contemplated for use as serial memories for computers. A parallel array of CCD charge transfer channels was provided with a CCD input line register arranged for loading their input ends from respective ones of its successive charge transfer stages. Charge packets, originally serially generated, were transferred into the line register during shift register operation and then transferred out in parallel. The parallel array of CCD charge transfer channels was provided a CCD output line register for unloading charge packets from their output ends in parallel to be converted back to serial format. While the charge packets in these serial memories contained bit information, similar serial memory architecture can be used with charge packets describing analog signal samples.

The present inventor points out that the frame-storage memory in a frame-transfer type of CCD imager that has one CCD line register at the input ends of its charge transfer channels and has another CCD line register at their output ends can be operated as such a serial memory for analog signal samples. Further, the sample data in the rows of charge packets read serially from the line register at one end of the frame-storage register can be used to generate charge packets descriptive of sample data that can be read serially into the line register at the other end of the frame-storage memory to rewrite the frame-storage memory as it is being read. More particularly, read-out of the frame-storage register can be carried out on a non-destructive basis, in sharp contrast to prior art practice. Selectively reading out from the frame-storage register permits a variety of imager operational modes not previously possible.

For example, this new frame-transfer type of CCD imager can prevent certain artifacts of motion from occurring on moving vertical edges in television cameras using line interlace in alternate fields. Frame transfers can be made during alternate field retrace intervals. The frame-storage register can be read out twice in successive field trace intervals. During the field trace interval when the first read-out from the frame storage register is made, a first of two sets of alternate lines of video signal samples can be selected for retiming at a halved sample rate, to supply the basis for generation of a continuous video signal in the line trace portions of that field trace interval. During the field trace interval when the second read-out from the frame storage register is made, the second set of alternate lines of video signal samples can be selected for retiming at the halved sample rate, to supply the basis for generation of continuous video signal in the line trace portions of that field trace interval.

This new frame-transfer type of CCD imager can be used to effectuate trade-offs between image resolution and camera sensitivity to radiant energy. One can re-read the frame-storage register several times, to keep flicker imperceptible, while sacrificing resolution of moving objects, to allow more field trace intervals over which to accumulate charge packets generated by photoconversion of radiant energy image elements. The sensitivity of the imager increases in direct proportion to increase in the image integration time, presuming there is no filling of the CCD charge transfer channel wells to overflowing.

Non-destructive read-out of the frame-storage register is preferably carried out entirely in the charge domain, without having to convert charge packets to voltage samples and to convert the voltage samples back into charge packets. This can be done using floating-gate electrometers. But lower-noise read out can be achieved using a floating-diffusion electrometer similar to that described by P. A. Levine in his U.S. patent application Ser. No. 729,651, filed May 2, 1985, entitled "TAPPED CCD DELAY LINE WITH NON-DESTRUCTIVE CHARGE SENSING FLOATING DIFFUSIONS", and assigned to RCA Corporation.

SUMMARY OF THE INVENTION

The invention is embodied in a frame-transfer type of CCD imager in which the frame-storage register may be electrically rewritten after being read. In preferred embodiments of the invention electrically rewriting the frame storage register is carried out entirely in the charge domain.

BRIEF DESCRIPTION OF THE DRAWING

FIG. 6 repeats FIG. 5 in more stylized form to establish the conventions used in FIGS. 7, 8, 9 and 10.

DETAILED DESCRIPTION

Figure 1:
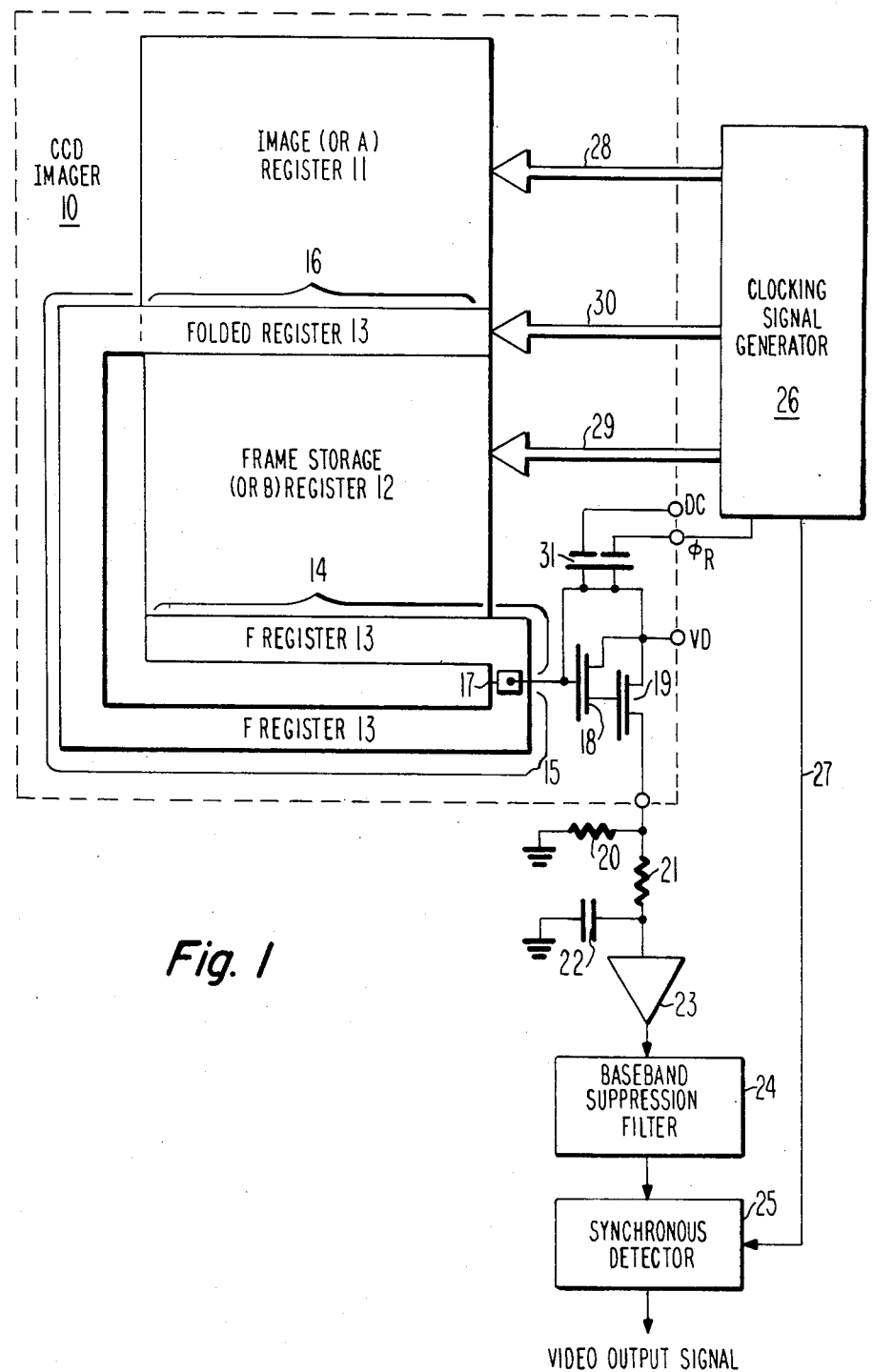
FIGS. 1, 2 and 3 are block schematic diagrams of CCD imagers, each being of frame-transfer type and embodying the invention differently.

In FIG. 1, a frame-transfer type CCD imager 10 is comprised within dashed outline. Imager 10 has an image (or A) register 11 and has a frame-storage (or B) register 12. Each of the registers 11, 12 comprises a plurality of CCD charge transfer channels in parallel array under a succession of gate electrodes, to which gate electrodes dynamic clocking signals are selectively applied for advancing the lines of charge packets stored in the ranks of the charge transfer stages defined in the charge transfer channels by the potentials applied to the overlying gate electrodes. Imager 10 is shown as having a folded line (or F) register 13 which comprises, in succession, line register portions 14, 15 and 16. Portion 14 of the folded line register 13 corresponds substantially to the output line register, or C register, found in prior-art frame-transfer type CCD imagers. The output ends of the charge transfer channels in the B register 12 load respective ones of the successive charge transfer stages in portion 14 of F register 13. The successive charge transfer stages of portion 16 of F register 13 are each disposed between the output end of a respective one of the A register 11 charge transfer channels and the input end of a respective one of the B register 12 charge transfer channels. A floating diffusion 17 is disposed in the portion 15 of the folded line register 13 just after portion 14 and is galvanically connected to the gate electrode of an insulated-gate field effect transistor 18. FET 18 is in common-drain amplifier connection and cooperates with floating diffusion 17 to serve as an electrometer, or charge sensing stage. FET 18 supplies at its source electrode a voltage indicative of the level of charge disposed between floating diffusion 17 and substrate ground, which voltage is applied to the gate of a source-follower FET 19 with a source load resistor 20. In usual practice, this source load resistor is located off the semiconductor substrate, external to the imager 10, to keep the thermal dissipation from the load resistor away from the imager.

The imager 10 output signal samples appearing across load resistor 20 are, in accordance with known practice, subjected to some low-pass filtering by resistor 21 and capacitor 22 to suppress extreme transient peaking prior to their application as input signal to a low-noise video pre-amplifier 23. Pre-amplifier 23 provides about ten times voltage amplification, and the amplified filtered imager output signal samples are supplied to a baseband-suppression filter 24. Filter 24 suppresses at least the lower baseband frequencies and the attendant 1/f noise (or "flicker noise"), and its output response is supplied as input signal to a synchronous detector 25. Synchronous detector 25 responds to a carrier signal harmonically related to the forward clocking frequency of "the output line register" 14 to homodyne to baseband the corresponding harmonic sidebands of the processed imager output samples supplied as input signal to synchronous detector 24. This carrier signal is supplied via connection 27 by a clocking signal generator 26. Generator 26 also generates forward clocking signals supplied to A register 11, B register 12 and F register 13 via busses 28, 29 and 30, respectively. For example, pulses, with repetition rate that is the same as that of F register 13 forward clocking signal, may be supplied as a switching signal to the sampling switch of a sampleand-hold circuit for the processed imager output signals, which circuit functions as the synchronous detector 25.

The portion 15 of folded line register 13 is used to transfer the charge packets from the output port of portion 14 of register 13 to the input port of portion 16 of register 13. Portion 15 of register 13 has a length in terms of delay therethrough equal to an integral number of scan lines (usually two for the F register routing shown). So, as one row of charge packets is being transferred left to right in register portion 14 and read out to floating diffusion 17, an earier read row of charge packets is shifted left to right into the register portion 16. The forward clocking of F register 13 takes place during line trace intervals. During each line retrace interval, a row of charge packets are transferred in parallel into the successive charge transfer stages of register portion 14 from the output ends of the parallelled charge transfer channels of B register 12. Concurrently, the input ends of these paraleed charge transfer channels receive, in parallel transfer charge packets from respective ones of the successive charge transfer stages in portion 16 of folded line register 13. So, one can arrange that, in successive frames of imager output signal, the frame storage register 12 contents will be read out non-destructively in each frame except the last. To implement this, during each field retrace interval preceding a re-reading of the contents of frame storage register 12, register 12 and folded line register 13 are forward clocked for an extra time equal to the number of line scan delays in portion 15 of folded line register 13.

In the recirculation of the contents of B register 12, then, line register portion 14 is operated as a parallel-to-serial-converting line register and line register portion 16 is operated as a serial-to-parallel-converting line register. Line register portion 14 continues its operation as a parallel-to-serial-converting line register during the final reading out of B register 12 contents.

During the last read-out of frame storage register 12 contents to floating diffusion 17, floating diffusion 17 is reset to drain voltage $V_D$ after sensing each charge packet thereon. This is done by applying a $\phi_R$ pulse to the gate electrode of a clamp transistor 31 to render its channel conductive. Preferably, to keep electrometer noise lower, transistor 31 is formed in an appendage of the CCD charge transfer channel, between floating diffusion 17 and a drain diffusion. Floating diffusion 17 forms the source, then, of clamp transistor 31. A cascode structure, with the first gate electrode at direct potential and with the second gate electrode reoeptive of $\phi_R$ reset pulses, is preferred, so $\phi_R$ pulses are not electrostatically coupled to the gate electrode of electrometer FET 18.

The folded line register 13 of the CCD imager 10 in FIG. 1 has a length one may desire to shorten. The high rate of clocking F register 13 aso tends to make charge transfer inefficiency and the smearing attendant thereto more of a problem in F register 13 than in the slower clocked A register 11 and B register 12. The F register 13 is forward clocked at high rate, so most of the energy for clocking is tied up in clocking register 13. So most of the power consumption associated with clocking is in F register 13. The portions 14 and 16 of F register 13 are necessary to the invention, so reduction or elimination of portion 15 is the key to reducing the clocking power consumption and to reducing smear, or loss of higher frequency video components. Reducing clocking power consumption also reduces the attendent heating of the imager, which undesirably raises dark current levels. It is desirable to keep dark current small, thereby to keep its accumulation as small as possible, particularly where the re-reading of frame storage register 12 over a succession of frames increases the time for accumulation of dark current in both that register and in the image register 11.

Figure 2:
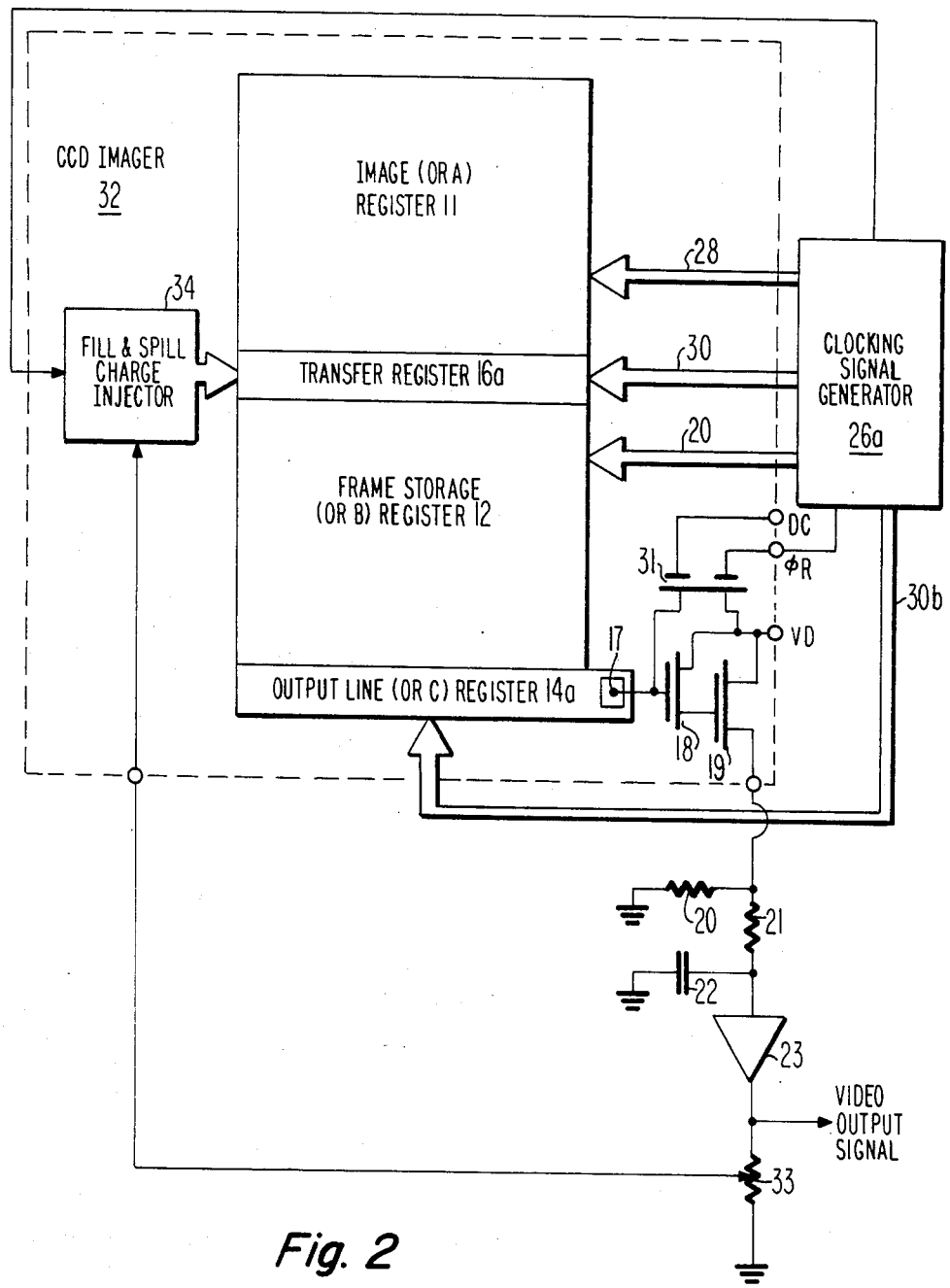

FIG. 2 shows an alternative CCD imager 32 for implementing the invention. In CCD imager 32 the portion 15 of folded register 13 is eliminated, to leave a transfer register 16a between A register 11 and B register 12, and to leave an output line C register 14a after B register 12. Forward clocking signals are supplied to registers 14a and 16a from clocking signal generator 26a via clocking busses 30a and 30b respectively. Video signal samples supplied to video pre-amplifier 23 during line trace interval are divided in a tapped load resistor 33 and converted back to charge packets by a low-noise linear CCD charge injector 34, such as a fill-and-spill circuit, to be inserted as serial input to transfer register 16a. The delay associated with the eliminated line register portion 15 does not have to be accounted for when the contents of frame storage register 12 are re-read, and clocking signal generator 26a differs from clocking signal generator 26 to accomodate this difference of CCD imager 32 from CCD imager 10. It is necessary in the FIG. 2 configuration to use as linear a charge injector 34 as possible and to control the conversion gain from one frame to the next, in order to avoid flicker at submultiple-frame-rate. Read-out from floating diffusion 17 may be conventional—that is, destructive at all times. This permits usable video output signal to be taken directly from the output connection of video pre-amplifier 23, without need for baseband suppression filter 24 and synchronous detector 25. However, filter 24 and synchronous detector 25 may be used to obtain video output signal with lower 1/f noise.

Figure 3:
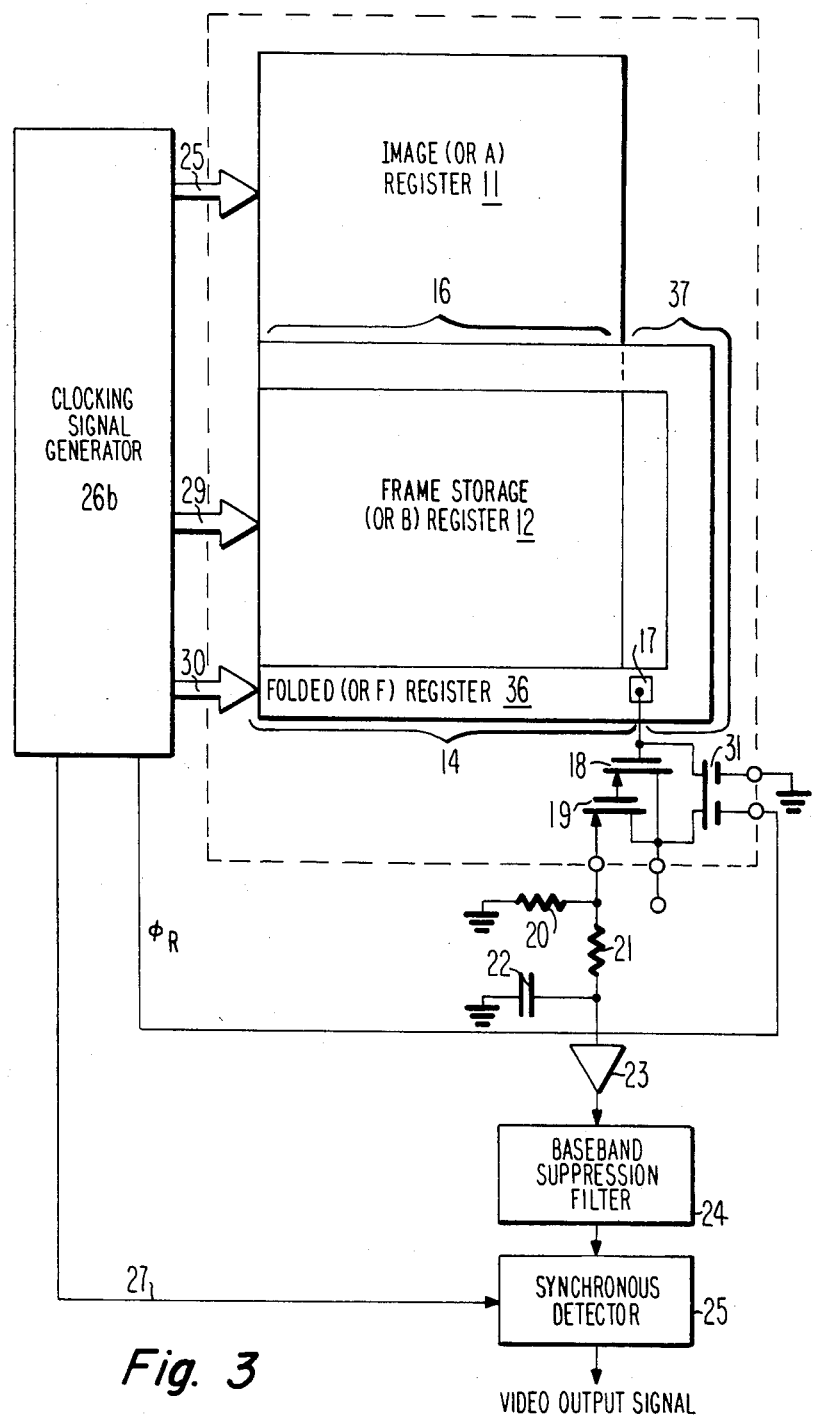

FIG. 3 shows an alternative CCD imager 35 having a folded line (or F) register 36 comprising successive line register portions 14, 37 and 16. Line register portion 37 can be shorter than line register portion 16. Typically, line register portion 37 is of a length to exhibit one scan line delay. A modified form 26b of clocking signal generator 26 accomodates this difference. The shorter routing of F register 36 as between sections 14 and 16 is accomplished by accepting reversal in line scan direction from one frame to the next when frame-storage register 12 is re-read.

Figure 4:
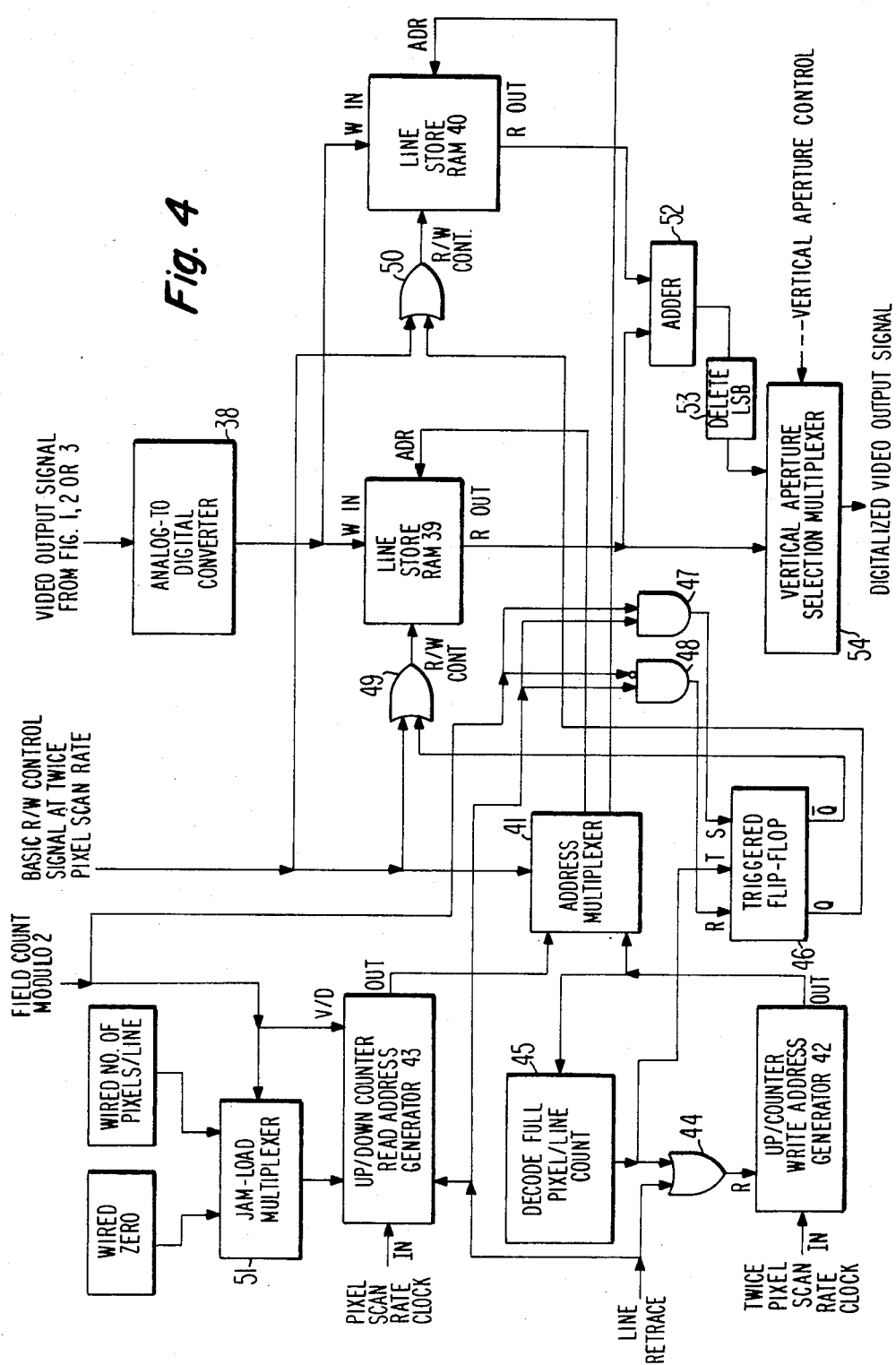
FIG. 4 is a block schematic diagram of line stretching apparatus for use with any of the CCD imagers of FIGS. 1, 2 and 3, particularly that of FIG. 3, to provide for field-to-field line interlace and for vertical aperture selection.

FIG. 4 shows one way of constructing line stretching apparatus, particularly suited for the FIG. 3 apparatus. Similar line stretching apparatus may be used with the FIG. 1 apparatus or FIG. 2 apparatus. The line stretching apparatus is useful for generating frames of video signal each comprising two successive line-interlaced fields, as in a broadcast television camera, for example. The frame of image element samples in frame storage register 12 of the imager is double-shutter progressively scanned. That is, in each of two successive fields (e.g., of one-sixtieth second duration each) every line of image element samples in B register 12 is read out progressively, in non-interlaced line sequence. In the first field scan the imager read-out is rewritten into the B register 12.

Alternate lines are used in each field as a basis for the final video signal. These alternately selected lines are half the duration of a normal line scan, so they must be stretched to occupy a normal scan line interval. Basically, the way this is done is by writing the line at double normal scan rate into memory external to the CCD imager, then reading the memory at normal scan rate. The write-the-line-at-double-scan-rate, then-read-the-line-at-normal-scan-rate process can be accompanied by a reversal of the scan line between writing and reading, if desired, which accomodates the use of the FIG. 3 CCD imager 35.

In FIG. 4 video output signal from one of the CCD imagers 10, 32, 35 of FIGS. 1, 2 and 3 is digitized by analog-to-digital converter 38 to supply write input to random access memories 39 and 40, which function as line stores for temporarily storing scan lines of image elements. Line store RAM 39 stores odd-numbered scan lines in odd-numbered fields and even-numbered scan lines in even-numbered fields. Line store RAM 40 stores even-numbered scan lines in odd-numbered fields and odd-numbered scan lines in even-numbered fields.

To this end, an address multiplexer 41 selects, as memory address during the write cycle of RAMs 39 and 40, the count output signal of a counter 42 that counts at twice pixelscan rate. During the read cycle of RAMs 39 and 40, address multiplexer 41 selects as memory address the count output of a counter 43 that counts at pixel scan rate.

Counter 42 counts in the up direction only, and its count is reset to ZERO after every row of charge packets parallelly transferred from frame storage register 12 has been serially read out from the CCD imager 10, 32 or 35. This resetting is responsive to a ONE output of an OR gate 44 being supplied to counter 42. On double-rate progressive line scans that are completed simultaneously with normal line scan in the line-interlaced digitized video output signal provided by the FIG. 4 line stretching apparatus, OR gate 44 supplies its ONE output responsive to a line retrace pulse and to an output ONE from a decoder 45. Decoder 45 supplies the output ONE responsive to its decoding counter 42 output count equaling the number of pixels per scan line. On double-rate line scans that are completed midway through normal line scan, OR gate 44 supplies its ONE output responsive to decoder 45 decoding counter 42 output count equaling the number of pixels per scan line.

A triggered set-reset flip-flop 46 is triggered by decoder 45 output ONEs to furnish indications, Q and its complement $\overline{Q}$, of which half of normal line scan the progressive line scan of the CCD imager currently falls in. On odd numbered fields (modulo-two number equals ONE) an AND gate 47 responds to line retrace pulse and to modulo-two field count equaling ONE to generate an output ONE applied to flip-flop 46 to set it to Q=1, $\overline{Q}$=0. That is, during odd-numbered fields flip-flop 46 is set during the first half of normal line scan and reset during the second half of line scan. On even-numbered fields (modulo-two number equals ZERO), an AND gate 48 responds to line retrace pulse and to the complement of modulo-two field number equaling ONE to generate an output ONE applied to flip-flop 46 to reset it to Q=0, $\overline{Q}$=1. That is, during even-numbered fields flip-flop 46 is reset during the first half of normal line scan and set during the second half of line scan. The timing of the reset and set pulses is delayed slightly past the triggering pulses so the set ahd reset pulses confirm triggered state during field scan. The outputs Q, $\overline{Q}$ of flip-flop 46 are used to control which of the line store RAMs 39 and 40 is used for storing each line of progressive scan output signal supplied at twice normal scan rate from the CCD imager.

To this end, a basic BASIC READ/WRITE CONTROL signal at twice pixel scan rate is applied as input signals to OR gates 49 and 50, the output connections of which furnish READ/WRITE CONTROL signals to line store RAM 39 and to line store RAM 40, respectively. RAMs 39 and 40 are arranged to write responsive to a ZERO applied as READ/WRITE CONTROL signal and to read responsive to a ONE applied as READ/WRITE CONTROL signal. Flip-flop 46 $\overline{Q}$ and Q output signals are applied as input signals to OR gate 49 and to OR gate 50, respectively. On odd-numbered fields, the set condition of flip-flop 46 ($\overline{Q}$=0) during the first half of normal line scan allows RAM 39 to be written with a line of progressive line scan at twice normal pixel scan rate, and the reset condition ($\overline{Q}$=0) of flip-flop 46 during the second half of normal line scan allows RAM 49 to be written with the succeeding line of progressive scan supplied from the CCD imager at twice normal pixel scan rate. Conversely, on even-numbered fields, the reset condition of fip-flop 46 ($\overline{Q}$=0) during the first half of normal line scan alows RAM 40 to be written, and the set condition of flip-flop 46 during $\overline{Q}$=0) the second half of normal line scan allows to be written.

When the BASIC READ/WRITE CONTROL signal supplied as input signals to OR gates 49 and 50 is ZERO, then address multiplexer 41 responds to this signal to apply write address from counter 42 to the one of RAMs 39 and 40 which is allowed to be written. The one of RAMs 39 and 40 conditioned for reading by its READ/WRITE CONTROL signal would provide a spurious read-out. This is prevented by control applied to the RAM, or the spurious read-out is arranged to be discarded.

When the BASIC READ/WRITE CONTROL signal supplied as input signals to OR gates 49 and 50 is ONE, address multiplexer 41 responds to this signal to apply read addresses from counter 43 to both RAMs 39 and 40. Counter 43 scans the pixel locations of the scan lines stored in RAMs 39 and 40 at normal pixel scan rate. If the CCD imager 10 of FIGURE 1 or the CCD imager 32 of FIG. 2 is used, counter 43 may be simply an up counter, reset to ZERO responsive to line retrace pulse and counting responsive to pixel scan rate clock to full pixel line count during the normal line scan interval. The successively scanned pixels are each read out twice as sample data, and the duplicate sample data may be arranged to be discarded.

FIG. 4 shows the counter 43 as being an up/down counter arranged for operation with the CCD imager 35 of FIG. 3 in which the direction of line scan is reversed from field to field. On odd-numbered fields, the field count modulo-two being ONE conditions a jam-load multiplexer 51 to select wired ZERO to be jam-loaded into up/down counter 43 responsive to line retrace pulse. The field count modulo-two being ONE also conditions up/down counter to count upward from ZERO to full PIXEL/LINE count at normal pixel scan rate. On even-numbered fields, the field count modulo-two being ZERO conditions jam-load multiplexer 51 to select wired number of pixels/line to be jam-loaded into up/down counter 43 responsive to line retrace pulse. The field count modulo-two being ZERO also conditions up/down counter 43 to count downward from full PIXEL/LINE count to ZERO at normal pixel scan rate.

Line-store RAMs 39 and 40 read out, in parallel, at normal pixel scan rate, lwo adjacent scan lines from image register 12. The pairwise phasing of these two lines alternates from field to field. An adder 52 adding these two scan lines will supply a scan line with an effectively doubled vertical aperture. The signal components of the two added scan lines are highly correlated and add arithmetically to increase signal level twofold. The noise components of the two summed scan lines are essentially random and uncorrelated and add vectorially to increase noise level by square-root-of-two. So, the summed scan lines provide the CCD camera about a 3 dB increase in usable sensitivity at low light levels, at the cost of increased aliasing of high-spatial-frequency content of the image. A connection 53, for deleting the least significant bit of adder 52 output signal, divides its output signal level by two, to supply the summed scan lines at the same level as the single scan line output of RAM 39 read-out.

A vertical aperture selection multiplexer 54 responds to a VERTICAL APERTURE CONTROL signal supplied responsive to command by the camera operator, or responsive to circuitry for determining average brightness in RAM 39 read-out, to select RAM 39 read-out as digitized video output signal under normal light level conditions. This selection is made to minimize aliasing of high spatial frequencies in the direction perpendicular to line scan. Under low light level conditions, multiplexer 54 selects the average of adjacent ine scan pairs to gain the 3 dB greater usable sensitivity. Note that this 3 dB greater usable sensitivity is relative to a usable sensitivity essentially the same as for a CCD imager having an image register read once per field rather than once per frame. The prior art CCD imager read once per field has the same image register area apportioned over half so many scan lines, a 3 dB advantage which is offset by the 3 dB disadvantage of half so long image integration time. In the CCD imager of the present invention successive field pairs are sampled over the same time interval, so aliasing does not occur on edges perpendicular or skewed respective to line scan, no matter which aperture selection is made by multiplexer 54.

Where vertical aperture selection capability is not of interest, but the provision of field-to-field line interlace without vertical edge aliasing is of interest, the FIG. 4 line stretching apparatus may be simplified. Elements 40, 50, 52, 53 and 54 are omitted. Digitized video output siqnal is read out of line-store RAM 39 directly.

Still further increase in usable sensitivity in the CCD camera output signal can be achieved by combining increased time between frame transfers, to allow for longer image integration time, with multiple shuttering in which the field storage register 12 is re-read multiply. This gain is achieved at the cost of degraded performance in two other regards. The slower "shutter rate" of the image register 11 owing to longer image integration times increases the blurring of moving objects in the image, and there is no good way presently known for undoing these undesired convolutional effects between image sampling locations and image.

There is also increased submultiple-of-framerate flicker caused by the losses in recirculating image samples due to inefficiencies in charge transfers. This low-rate flicker can be alleviated to a degree. In the FIG. 2 CCD imager one can reduce the low-rate flicker by adjustment of the tapping of load resistor 33 to get unity gain recirculation of image data. One can also arrange to compensate any of the CCD imager output signals to increase post-imager voltage gain incrementally with each reading of the field. One way to do this, so gain can be correctly ad3usted automatically, is to inject an extra line of standard-size charge packets into the input end of line register portion 14 (or 14') prior to first parallel transfer of a line of charge packets from frame storage register 12 for each frame. Response to each successive read-out of these standard-size charge packets can be compared to first read-out to develop the error signal needed to correct post-imager voltage gain. This error signal is then sampled and held to maintain that value of post-imager voltage gain throughout the succeeding read-out of frame storage register 12.

Figure 5:
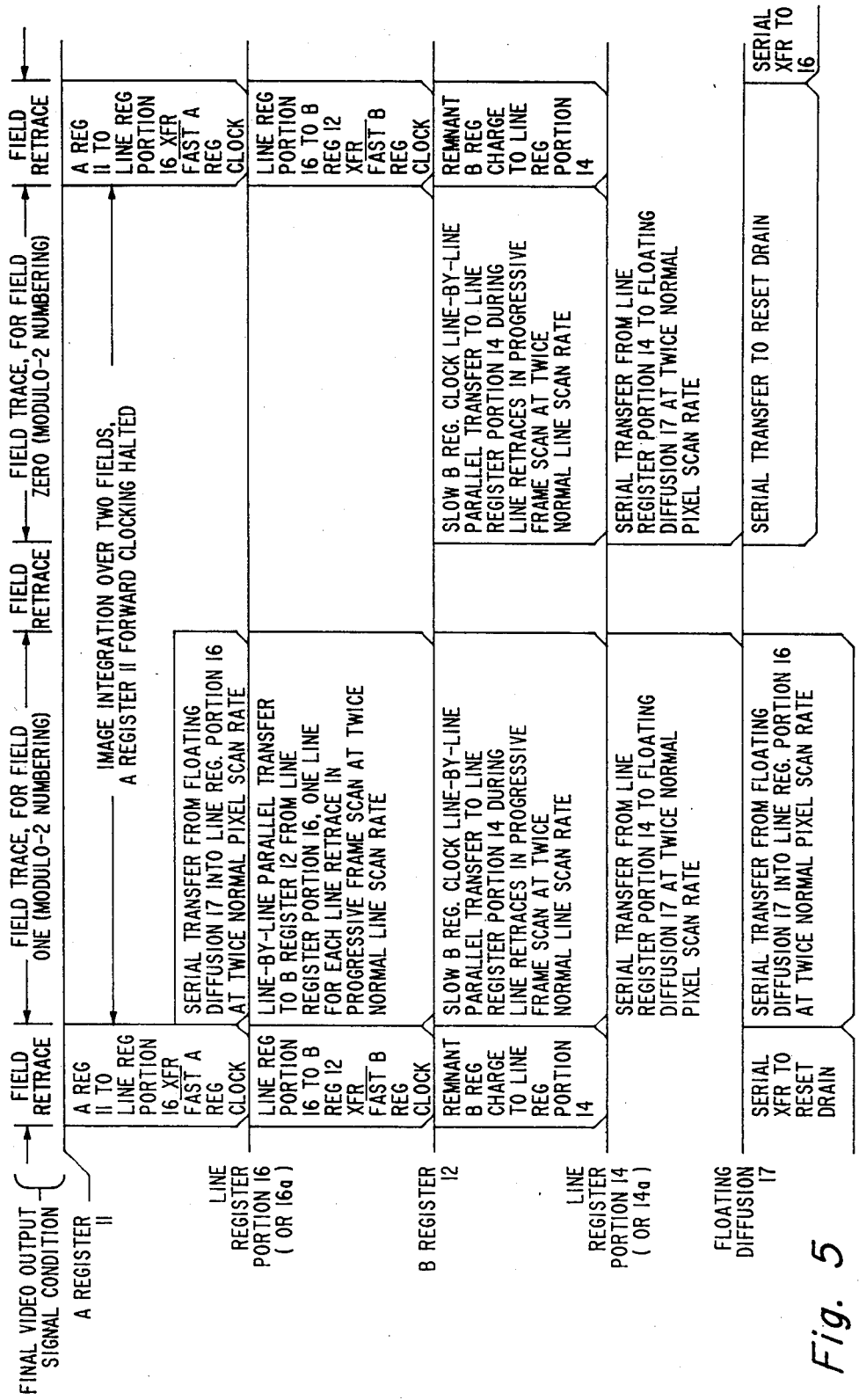
FIGS. 5-10 are timing diagrams of charge transfer in CCD imagers embodying the invention.

FIG. 5 is a timing diagram of charge transfer over a frame, as has been previously described. (The description of each charge transfer operation is written within the bounds of a stylized arrow pointing in the direction of charge transfer.) A register 11 clocking is halted for an odd-number field trace interval, the succeeding field retrace interval, and the succeeding even-numbered field trace interval, over which times image integration continues. The disposal of remnant charge from B register 12 during its fast forward clocking in a field retrace interval, after B register has been emptied of image samples the preceding even-numbered field trace interval, can be carried out a number of ways analogous to those known in the prior art operation of frame transfer CCD imagers. Disposal of remnant charge from B register 12 is shown being accomplished by continuous clocking of the remnant charge dumped into line register portion 14 to floating diffusion 17 and thence to reset drain. The serial transfer from line register portion 14 to line register portion 16 cannot be shown in the plane of the paper. In FIG. 5 the serial transfer is denoted by two stylized arrows; and in FIGS. 6, 7 and 8 this transfer is represented by a conduit in the field retrace interval.

Figure 6:
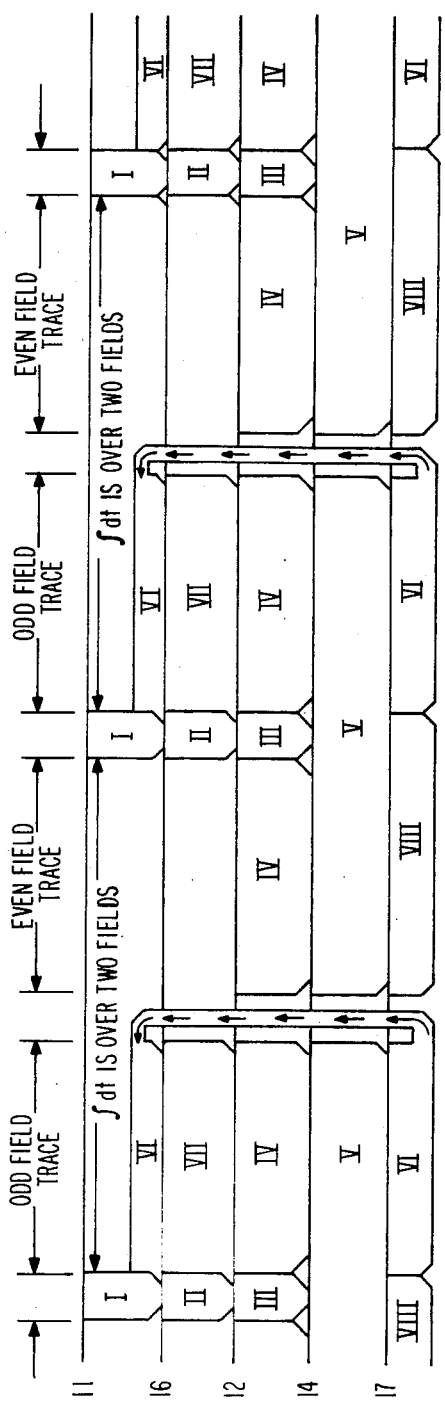

FIG. 6 is a timing diagram of charge transfer which repeats FIG. 5 in an abstracted, replicated form. The various types of charge transfer patterns are identified in FIG. 6 by Roman numerals rather than written out legends as in FIG. 5. FIG. 6 considered together with FIG. 5 establishes the shorthand notation to be used for these types of charge transfers which will be used in FIGS. 7 and 8.

Figure 7:
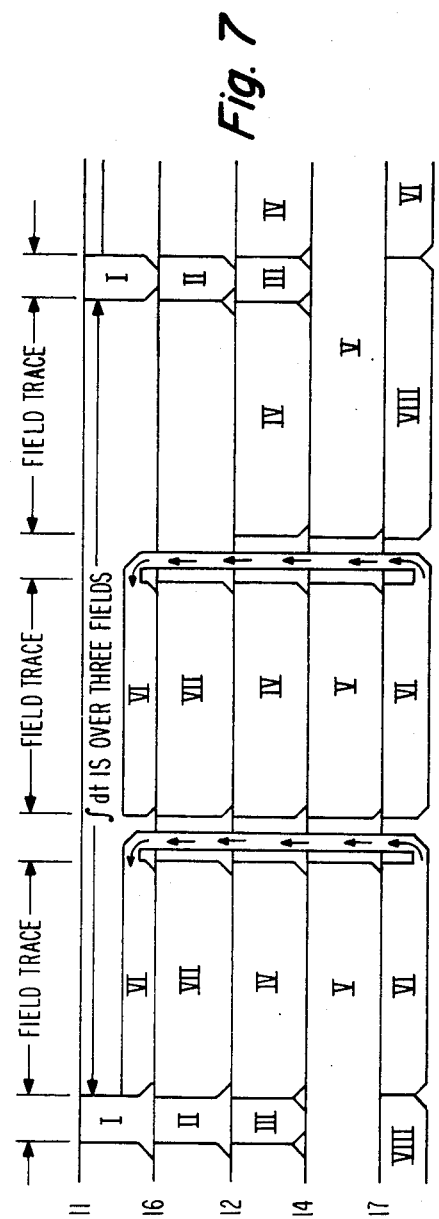

FIG. 7 is a timing diagram of charge transfer when the integration time in the image register 11 is extended over three field trace times. The contents of frame storage register 12 are read out, rewritten into frame storage register 12, read out a second time, rewritten into frame storage register 12 again, read out a third time, and then discarded to reset drain. The line trace pattern is changed from field to field based on field number modulo-two, just as when image integration extends over two field trace intervals, so line interlace is properly maintained.

Figure 8:
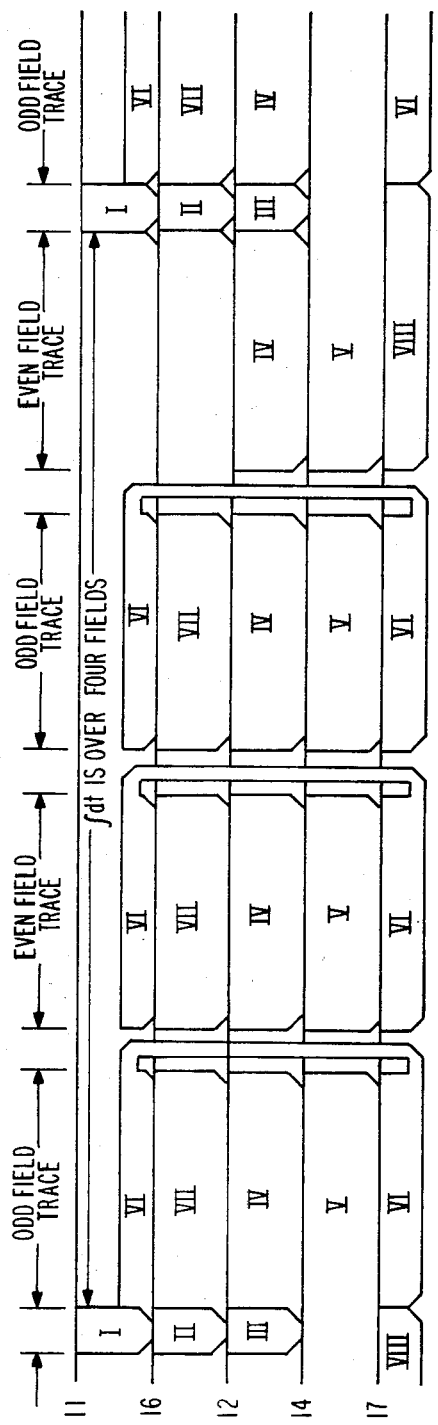

FIG. 8 is a timing diagram of charge transfer when the integration time in the image register 11 is extended over four field trace times. The image integration time can be extended over any integral number of field trace times, until performance in other respects than imager sensitivity are adversely affected too much to justify the increase in sensitivity. In a CCD imager having an erasable image register 11, the beginning of image integration can be delayed, to provide any desired image integration interval, even ones extending over a non-integral number of field trace intervals.

Figure 9:
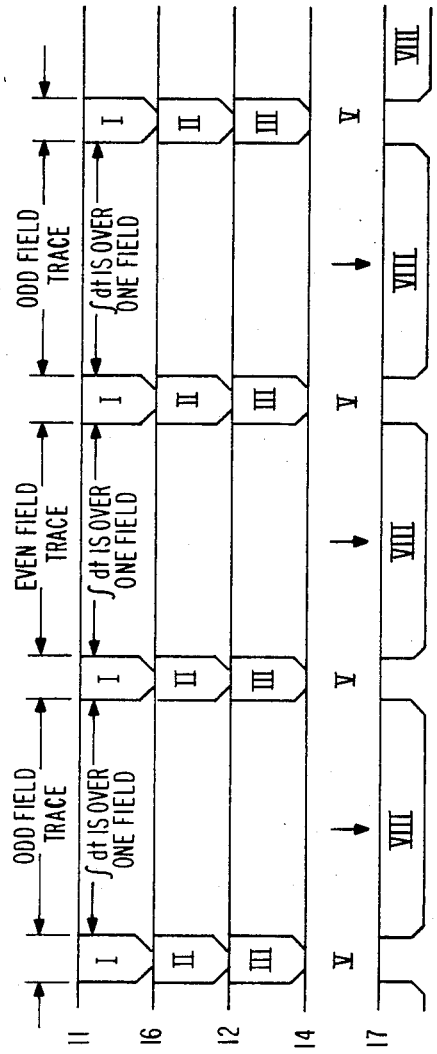

FIG. 9 is a timing diagram showing how the frame-transfer CCD imager clocking is modified during high-speed photography (e.g., for slow-motion effect). The A register 11 is read out every field retrace interval, and the contents of B register 12 are not recirculated. Aliasing of moving vertical edges will be noticable; this is the cost of shortening image integration time by half.

Broadcast television cameras are almost invariably color responsive. Responses to the individual primary colors or their complements may be generated using respective CCD imagers receiving respective images from a beam-splitter with color filters associated therewith. The simplest beam splitters use single-reflection of certain of the images, causing them to be inverted or perverted respective to the other images supplied by the same beam splitter. It is useful then to have the capability in a CCD imager to obtain normal line sequence video signal from erect or inverted image. The imagers of the present invention are readily adapted to do this. The FIG. 1 CCD imager 10 or the FIG. 3 CCD imager may be operated so that the B register 12 is clocked out during read-out in the opposite direction it is clocked during its initial writing from A register 11. The direction of serially clocking the F register is reversed also, so line register portion 16 supplies output charge packets to floating diffusion 17. These charge packets are selectively dumped into reset drain by "reset transistor" 31 or are serially loaded into line register portion 14 to supply rows of charge packets for re-writing B register 12.

In these operations, line register portion 16 is operated as a parallel-to-serial-converting line register. When B register 12 contents are circulated to be rewritten, line register portion 14 operates as a serial-to-parallel converting line register.

With the FIG. 1 CCD imager it is desirable to modify the FIG. 5 apparatus to take into account the direction of scanning a line of pixels from line register portion 16 during transfer past floating diffusion 17 being opposite to the direction of scanning a line of pixels from line register portion 14 during transfer past floating diffusion 17. This can be simply done by supplying the complement of field count modulo-two, rather than field count modulo-two, to jam-load multiplexer 57 as control signal and to the read address generator up/down counter as direction-of-count signal. Where the delay through line register portion is two scan lines long, one may re-position floating diffusion to provide equal delay from either of the output ports of line register portions 14 and 16. This simplifies synchronizing the clocking of two CCD imagers scanned in opposite line sequence.

Figure 10:
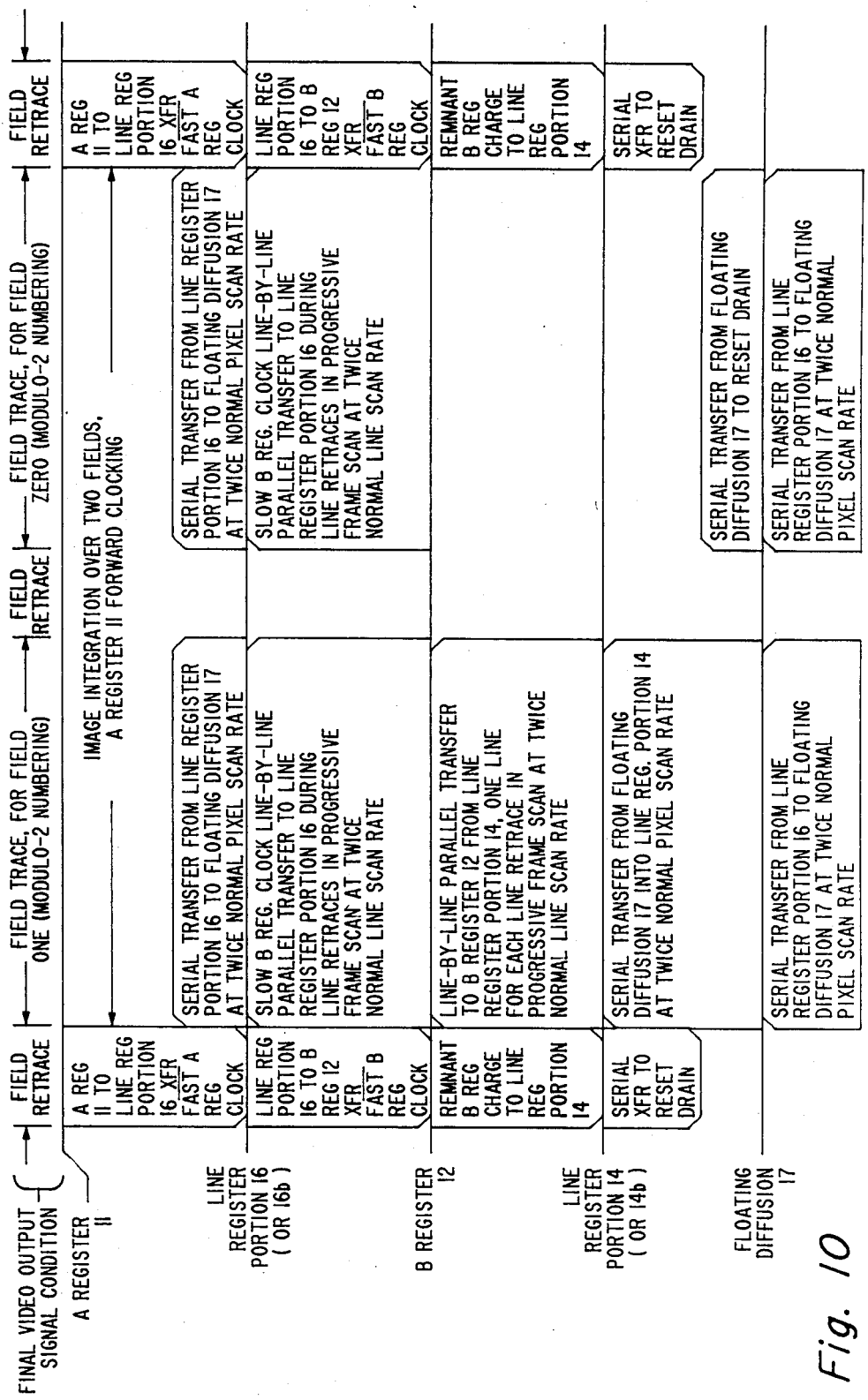

FIG. 10 shows a timing diagram for operation with image integration extending over most of a frame duration. Field scan is in opposite line-sequence to FIG. 5 in this embodiment of the invention. Analogously, the FIG. 7, 8 and 9 timing sequences can be adapted for opposite-line-sequence field scan in further modes of operation in accordance with the invention.

Figure 11:
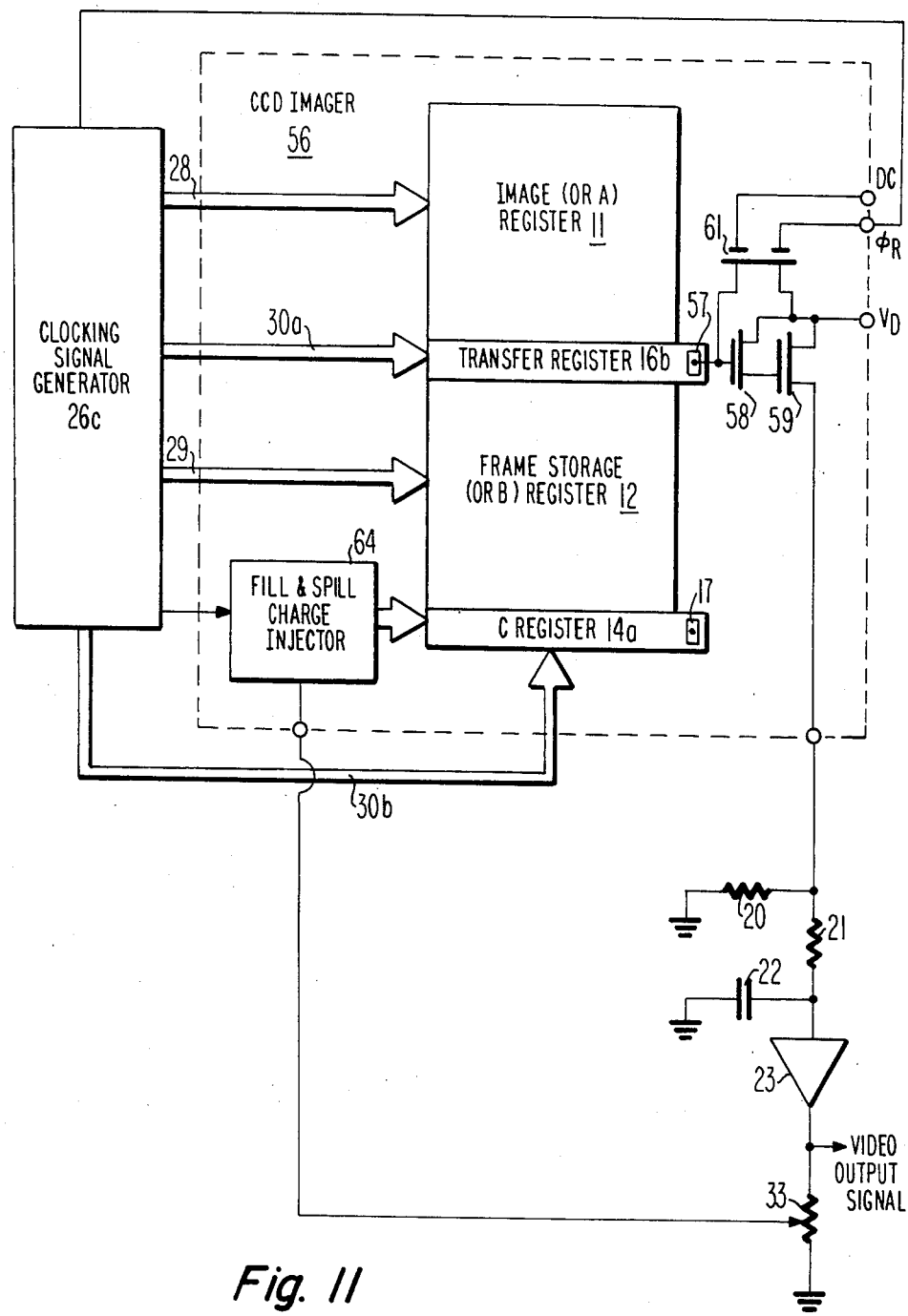
FIG. 11 is a block schematic diagram of a CCD imager of frame transfer type embodying the invention in another way.

FIG. 11 shows a CCD imager 56 connected to provide opposite-line-sequence field scan to the CCD imager 32 shown in FIG. 2. A clocking signal generator 26c which replaces generator 26a forward clocks B register 12 during its being written from A register 11 to update image sample content, but reverse clocks B register 12 during the read-out and re-writing of B register 12. Transfer register 16b is provided with a floating diffusion 57 connected to the gate electrode of electrometer FET 58. FET 58 is followed by source follower 59, which is shown connected to supply load resistor 20. Reset clamping of floating diffusion 57 is by a reset transistor 61 of which diffusion 57 is the source. A portion of the video output signal is applied to charge injector 64 to supply charge packets serially as input to C register 14b, to be re-written in parallel a line at a time into reverse-clocked B register 12 during line retrace intervals of the progressive field scan.

The FIG. 2 and FIG. 11 oonfigurations may be alternatively implemented, using a sinqle CCD imager. The one of fill-and-spill charge injectors 34 and 64 not used for re-circulating image samples to B register 12 may be used to inject fat-zero bias charges to improve charge transfer efficiency near black level. The ability selectively to read out from B register 12 in either line sequence can be useful in certain transfer smear suppression schemes.

One may arrange to read out and then re-write the contents of the B register of a field-transfer imager, in accordance with the invention, where the A register clocking pattern is halted in different phasing on alternate fields, and where the B register can store only one of the two fields of a television frame. Line interlace will be lost when this is done—either completely, where line pairing in successive fields is employed, or partially, where line averaging is employed in alternate fields.

Thusfar the advantages of recirculating the contents of the frame-storage registers have been discussed primarily with regard to television cameras, which use field-to-field line interlace, but the invention is advantageous also in non-interlaced television cameras. Recirculating the contents of the B register to allow longer image integration time in the A register is advantageous in low-light-level surveillance work whether or not line interlace is employed.

In still cameras using cooled frame-transfer CCD imagers, when the A register integration times are long to permit low-light-level photography, recirculation of B register content to multiply shutter infrequently written frames can generate flicker-free video for viewing on a small video monitor. One can see using this electronic viewfinder what one cannot see with an optical viewfinder.

The invention may also be embodied in a CCD imager with a mirror-symmetrical achitecture, the right half of which is similar to CCD imager 35 of FIG. 3. The parallel flow of image samples from the two imager halves allows the full frame to be read out from the imager in one field time at normal pixel scan rate, rather than having to read out at twice pixel scan rate. Scan conversion is required to obtain normal raster scan video signal with field-by-field line interlace, of course. A scan converter that delays one of the electrometer outputs by half a scan line time and reverses its duration of scan is required. The electrometer output selected for delay and scan reversal alternates from field to field. Two alternate-line sequential signals are generated. One of these may be selected as video output signal, or they may be additively combined to obtain a video output signal with double the vertical aperture.

What is claimed is:

1. In combination:
   a CCD serial memory having a first succession p in number of charge transfer stages connected for operation as a serial-to-parallel-converting CCD line register, a second succession p in number of charge transfer stages connected for operation as a parallel-to-serial-converting CCD line register, and a plurality p in number of CCD charge transfer channels in parallel array having first ones of their ends connected to receive charge supplies in parallel from the charge transfer stages of said first CCD line register and having second ones of their ends connected to supply charge packets in parallel to the charge transfer stages of said second CCD line register;

means for non-destructively sensing the charge packets serially supplied form said parallel-to-serialconverting CCD line register;

means selectively applying said charge packets serially supplied from said parallel-to-serial-converting CCD line register to said serial-to-parallel-converting CCD line register through a charge transfer channel entirely in the charge domain without conversion to voltage between said parallel-to-serial-converting line register and said serial-to-parallel-converting line register for selectively recirculating the contents of said serial memory; and means for periodically transferring successive lines of charge packets in parallel into said parallel array of CCD charge transfer channels via respective ones of the charge transfer stages in one of said CCD line registers.

2. A camera comprising:

a CCD imager;

a first parallel array of charge transfer channels arranged as an image register in said CCD imager for integrating radiant energy images;

a second parallel array of charge transfer channels, arranged as a storage register in said CCD imager for storing the contents of said first parallel array of charge transfer channels as transferred thereto during periodic image transfer intervals said periodic image transfer intervals being arranged in each $n^{th}$ successive field retrace interval of an output video signal closing a cycle of n field scans, n being a selectable positive integer of one or more;

means for reading out the contents of said second parallel array of charge transfer channels during the times between said periodic image transfer intervals; and means for selectively rewriting the read-out contents of said second parallel array of charge transfer channels back into them on the initial field scans of a cycle when n is selected to be at least two, said selective rewriting permitting trade-offs between image resolution of the camera and sensitivity of the camera.

3. A camera comprising:

a CCD imager;

an image register in said CCD imager, with a plurality of CCD charge transfer channels in parallel array under a succession of gate electrodes, to which gate electrodes first dynamic clocking signals are applied during periodic image transfer intervals for transferring lines of parallelly supplied charge packets from output ends of the underlying charge transfer channels, and to which gate electrodes static clocking signals are applied during intervening image integration times;

a storage register in said CCD imager, with a plurality of CCD charge transfer channels in parallel array under a successsion of gate electrodes, to which gate electrodes second dynamic clocking signals of similar rate to said first dynamic clocking signals are applied for transferring charge packets from first ends of said underlying charge transfer channels to their second ends during said periodic image transfer intervals, to which gate electrodes third dynamic clocking signals are applied during selected portions of the times between successive image transfer intervals, which selected portions fall between line scan times, to transfer charge packets from said storage register a line at a time before each line scan time;

a first CCD line register in said CCD imager, including a succession of charge transfer stages selectively forward clocked during each scan line time, each charge transfer stage being located between the output end of a respective CCD charge transfer channel in said image register and the first end of a respective CCD charge transfer channel in CCD charge transfer channel in said storage register and transferring charge packets therebetween during times said image register gate electrodes receive said first dynamic clocking signals and said storage register gate electrodes receive said second dynamic clocking signals;

a second CCD line register in said CCD imager, including a succession of charge transfer stages selectively forward clocked during each scan line time, each charge transfer stage being located next to the second end of a respective CCD charge transfer channel of said storage register;

means for transferring charge packets serially from the last charge transfer stage of one of said first and second CCD line registers, which line register is operated as a parallel-to-serial-converting line register, and supplying said charge packets serially, during selected line scans, through a charge transfer channel entirely in the charge domain without conversion to voltage between said first and second CCD line registers to the first charge transfer stage of the other of said first and second line registers, which line register is operated as a serial-to-parallel-converting line register; and means for sensing the charge packets serially transferred from said parallel-to-serial-converting line register, for supplying imager output signal samples.

4. A camera as set forth in claim 3 wherein said first CCD line register is said serial-to-parallel-converting line register, wherein said second CCD line register is said parallel-to-serial-converting ine register, and wherein said storage register receives third dynamic clocking signals that transfer charge packels in the direction from said first CCD line register to said second CCD line register.

5. A camera as set forth in claim 4, wherein said first CCD line register is the final portion of a longer CCD line register an integral number at least three scan lines long, and wherein said second CCD line register is the initial portion of said longer CCD line register.

6. A camera as set forth in claim 5 wherein said means for supplying imager output signa samples is a floating-diffusion electrometer.

7. A camera as set forth in claim 6 in including:

filter means for suppressing the baseband content of said imager output signal samples, and means for synchronously detecting the output response of said filter means at a harmonic of the forward clocking rate of said second CCD line register to develop a continuous video signal.

8. A camera comprising:

a CCD imager;

an image register in said CCD imager, with a plurality of CCD charge transfer channels in parallel array under a succession of gate electrodes, to which gate electrodes first dynamic clocking signals are applied during periodic image transfer intervals for transferring lines of parallelly supplied charge packets from output ends of the underlying charge transfer channels, and to which gate electrodes static clocking signals are applied during intervening image integration times;

a storage register in said CCD imager, with a plurality of CCD charge transfer channels in parallel array under a succession of gate electrodes, to which gate electrodes second dynamic clocking signals of similar rate to said first dynamic clocking signals are applied for transferring charge packets from first ends of said underlying charge transfer channels to their second ends during said periodic image transfer intervals, to which gate electrodes third dynamic clocking signals are applied during selected portions of the times between successive image transfer intervals, which selected portions fall between line scan times, to transfer charge packets from said storage register a line at a time before each line scan time;

a first CCD line register in said CCD imager, including a succession of charge transfer stages selectively forward clocked during each scan line time, each charge transfer stage being located between the output end of a respective CCD charge transfer channel in said image register and the first end of a respective CCD charge transfer channel in CCD charge transfer channel in said storage register and transferring charge packets therebetween during times said image register gate electrodes receive said first dynamic clocking signals and said storage register gate electrodes receive said second dynamic clocking signals;

a second CCD line register in said CCD imager, including a succession of charge transfer stages selectively forward clocked during each scan line time, each charge transfer stage being located next to the second end of a respective CCD charge transfer channel of said storage register, said storage register being receptive of third dynamic clocking signals which transfer charge packets in the direction from said first CCD line register to said second CCD line register;

means for transferring charge packets serially from the last charge transfer stage of one of said first and second CCD line registers, which is operated as a parallel-to-serial-converting line register;

means for supplying charge packets serially, during selected line scans, to the first charge transfer stage of the other of said first and second line registers, which line register is operated as a serial-to-parallel converting line register, which supplied charge packets are responsive to those serially transferred from said parallel-to-serial converting line register;

means for sensing the charge packets serially transferred from said parallel-to-serial-converting line register, for supplying imager output signal samples; and means for providing field-to-field interlace between odd-numbered and even-numbered ones of consecutively numbered fields successive in time, which means comprises:

means for transferring a row of charge packets from the second ends of the charge transfer channels of said storage register to respective charge transfer stages of said second CCD line register, during each normal-rate line retrace interval and midway during each normal-rate line trace interval;

means for forward clocking said first and second CCD line registers, and any CCD line register of which they are parts, at twice normal pixel scan rate during line scans before and after said transfers of rows of charge packets midway during each normal-rate line trace interval;

means for transferring a row of charge packets from said first line register to the first ends of the charge transfer channels of said storage register, in selected fields, during each normal-rate line trace interval and midway during each normal-rate line trace interval;

means for selecting alternate ones of consecutively numbered successive-in-time scan lines of said imager output samples in each successive field scan, one set being selected in odd-numbered fields and the other set being selected in even-numbered fields; and means for retiming the imager output samples in each selected line so as to appear in normal line scan order at normal pixel scan rate.

9.

A camera comprising:

a CCD imager;

an image register in said CCD imager, with a plurality of CCD charge transfer channels in parallel array under a succession of gate electrodes, to which gate electrodes first dynamic clocking signals are applied during periodic image transfer intervals for transferring lines of parallelly supplied charge packets from output ends of the underlying charge transfer channels, and to which gate electrodes static clocking signals are applied during intervening image integration times;

a storage register in said CCD imager, with a plurality of CCD charge transfer channels in parallel array under a succession of gate electrodes, to which gate electrodes second dynamic clocking signals of similar rate to said first dynamic clocking signals are applied for transferring charge packets from first ends of said underlying charge transfer channels to their second ends during said periodic image transfer intervals, to which gate electrodes third dynamic clocking signals are applied during selected portions of the times between successive image transfer intervals, which selected portions fall between line scan times, to transfer charge packets from said storage register a line at a time before each line scan time;

a first CCD line register in said CCD imager, including a succession of charge transfer stages selectively forward clocked during each scan line time, each charge transfer stage being located between the output end of a respective CCD charge transfer channel in said image register and the first end of a respective CCD charge transfer channel in CCD charge transfer channel in said storage register and transferring charge packets therebetween during times said image register gate electrodes receive said first dynamic clocking signals and said storage register gate electrodes receive said second dynamic clocking signals;

a second CCD line register in said CCD imager, including a succession of charge transfer stages selectively forward clocked during each scan line time, each charge transfer stage being located next to the second end of a respective CCD charge transfer channel of said storage register, said storage register being receptive of third dynamic clocking signals which transfer charge packets in the direction from said first CCD line register to said second CCD line register;

means for transferring charge packets serially from the last charge transfer stage of one of said first and second CCD line registers, which is operated as a parallel-to-serial-converting line register;

means for supplying charge packets serially, during selected line scans, to the first charge transfer stage of the other of said first and second line registers, which line register is operated as a serial-to-parallel converting line register, which supplied charge packets are responsive to those serially transferred from said parallel-to-serial converting line register;

means for sensing the charge packets serially transferred from said parallel-tp-serial-converting line register, for supplying imager output signal samples; and means for providing field-to-field line interlace between odd-numbered and even-numbered ones of consecutively numbered fields successive in time, which means comprises:

means for transferring a row of charge packets from the second ends of the charge transfer channels of said storage register to respective charge-transfer stages of said second CCD line register, during each normal-rate line retrace interval and midway during each normal-rate line trace interval;

means for forward clocking said first and second CCD line registers, and any CCD line register of which they are parts, at twice normal pixel scan rate during line scans before and after said transfer of rows of charge packets midway during each normal-rate line trace interval;

means for transferring a row of charge packets from said first line register to the first ends of the charge transfer channels of said storage register, in selected fields, during each normal-rate line trace interval and midway during each normal-rate line trace interval;

means for selecting, during the early portion of normal-rate line trace intervals, odd-numbered lines of imager output sanples in odd-numbered fields and even-numbered lines of imager output samples in even-numbered fields, as a first line-sequential signal; and means for selecting during the late portion of normal-rate line trace intervals, even-numbered lines of imager output samples in odd-numbered fields and odd-numbered lines of imager output samples in even-numbered fields, as a second line-sequential signal.

10. A camera as set forth in claim 9 wherein said means for providing field-to-field line interlace includes:

means for additively combining said first and second line-sequential signals to derive an output video signal with field-to-field line interlace.

11. A camera as set forth in claim 10 including:

means for obtaining a running average of said first and second line-sequential signals;

means for selecting one of said first and second line-sequential signals as an output video signal with field-to-field interlace, responsive to said CCD imager being receptive of relativey high average intensity optical images; and means for selecting the running average of said first and second line-sequential signals as said output signal with field-to-field interlace, responsive to said CCD imager being receptive of relatively low average intensity optical images.

12. A camera comprising:

a CCD imager;

an image register in said CCD imager, with a plurality of CCD charge transfer channels in parallel array under a succession of gate electrodes, to which gate electrodes first dynamic clocking signals are applied during periodic image transfer intervals for transferring lines of parallelly supplied charge packets from output ends of the underlying charge transfer channels, and to which gate electrodes static clocking signals are applied during intervening image integration times;

a storage register in said CCD imager, with a plurality of CCD charge transfer channels in parallel array under a succession of gate electrodes, to which gate electrodes second dynamic clocking signals of similar rate to said first dynamic clocking signals are spplied for transferring charge packets from first ends of said underlying charge transfer channels to their second ends during said periodic image transfer intervals, to which gate electrodes third dynamic clocking signals are applied during selected portions of the time between successive ixage transfer intervals, which selected portions fall between line scan times, to transfer charge packets from said storage register a line at a time before each line scan time;

a first CCD line register in said CCD imager, including a succession of charge transfer stages selectively forward clocked during each scan line time, each charge transfer stage being located between the output end of a respective CCD charge transfer channel in said image register and the first end of a respective CCD charge transfer channel in CCD charge transfer channel in said storage register and transferring charge packets therebetween during times said image register gate electrodes receive said first dynamic clocking signals and said storage register gate electrodes receive said second dynamic clocking signals;

a second CCD line register in said CCD imager, including a succession of charge transfer stages selectively forward clocked during each scan line time, each charge transfer stage being located next to the second end of a respective CCD charge transfer channel of said storage register, said storage register being receptive of third dynamic clocking signals which transfer charge packets in the direction from said second CCD line register to said first CCD line register;

means for transferring charge packets serially from the last charge transfer stage of said first CCD line register, which is operated as a parallel-to-serial-converting line register;

means for supplying charge packets serially, during selected line scans, to the first charge transfer stage of said second line register, which line register is operated as a serial-to-parallel converting line register, which supplied charge packets are responsive to those serially transferred from said parallel-to-serial converting line register;

means for sensing the charge packets serially transferred from said parallel-to-serial-converting line register, for supplying imager output signal samples.

13. A camera as set forth in claim 12, wherein said first CCD line register is the initial portion of a longer CCD line register an integral number at least three scan lines long, and wherein said second CCD line register is the final portion of said longer CCD line register.

14. A camera as set forth in claim 13 wherein said means for supplying imager output signal samples in a foating-diffusion electrometer.

15. A camera as set forth in claim 14 including:
filter means for suppressing the baseband content of said imager output signal samples, and
means for synchronously detecting the output response of said filer means at a harmonio of the forward clocking rate of said first CCD line register to develop a continuous video signal.

16. A camera as set forth in claim 12 including means for providing field-to-field interlace between odd-numbered and even-numbered ones of consecutively numbered fields successive in time, which means comprises;
means for transferring a row of charge packets from the first ends of the charge transfer channels of said storage register to respective charge transfer stages of said first CCD line register, during each normal-rate line retrace interval and midway during each normal-rate line trace interval;
means for forward clocking said first and second CCD line registers, and any CCD line register of which they are parts, at twice normal pixe scan rate during line scans before and after said transfers of rows of charge packets midway during each normal-rate line lrace interval;
means for transferring a row of charge packets from said second line register to the second ends of the charge transfer channels of said storage register, in selected fields, during each normal-rate line trace interval and midway during each normal-rate line trace interval;
means for selecting alternate ones of consecutively numbered successive-in-time scan lines of said imager output samples in each successive fied scan, one set being selected in odd-numbered fields and the other set being selected in even-numbered fieds; and means for retiming the imager output samples in each selected line so as to appear in normal line scan order at normal pixel scan rate.

17. A camera as set forth in claim 12 including means for providing field-to-field line interlace between odd-numbered and even-numbered ones of consecutively numbered fields successive in time, which means comprises:
means for transferring a row of charge packets from the first ends of the charge transfer channels of said storage register to respective charge-transfer stages of said first CCD line register, during each normal-rate line retrace interval and midway during each normal-rate line trace interval;
means for forward clocking said first and second CCD line registers, and any CCD line register of which they are parts, at twice normal pixel scan rate during ine scans before and after said transfer of rows of charge packets midway during each normal-rate line trace interval;
means for transferring a row of charge packets from said second line register to the second ends of the charge transfer channels of said storage regiser, in selected fields, during each normal-rate line trace interval and midway during each normal-rate ine trace interval;
means for selecting, during the early portion of normal-rate line trace intervals, odd-numbered lines of imager output samples in odd-numbered fields and even-numbered lines of imager output samples in even-numbered fields, as a first line-sequential signal; and
means for selecting during the late portion of normal-rate line trace intervals, even-numbered lines of imager output sampes in odd-numbered fields and oddnumbered lines of imager output samples in even-numbered fields, as a second line-sequential signal.

18. A camera as set forth in claim 17 wherein said means for providing field-lo-field line interlace includes:
means for additively combining said first and second line-sequential signals to derive an output video signal with field-to-field line interlace.

19. A camera as set forth in claim 18 including:
means for obtaining a running average of said first and second line-sequential signals;
means for seecting one of said first and second line-sequential signals as an output video signal with field-to-field interlace, responsive to said CCD imager being receptive of reatively high average intensity optical images; and
means for selecting the running average of said first and second line-sequential signals as said output signal with field-to-field interlace, responsive to said CCD imager being receptive of relatively low average intensity optical images.

* * * * *

UNITED STATES PATENT AND TRADEMARK OFFICE
CERTIFICATE OF CORRECTION

PATENT NO. : 4,656,520

DATED : April 7, 1987

INVENTOR(S) : Robert Norman Hurst

It is certified that error appears in the above-identified patent and that said Letters Patent is hereby corrected as shown below:

Column 5, line 20, "paraleed" should be -- parallelled --.

Column 5, line 51, "reoeptive" should be -- receptive --.

Column 7, line 65, "ahd" should be -- and --.

Column 8, line 25, insert "RAM 39" between "allows" and "to".

Column 9, line 2, "lwo" should be -- two --.

Column 13, line 47, insert "(n-1)" between "initial" and "field".

Column 13, line 66, "successsion" should be -- succession --.

Column 14, line 49, "ine" should be -- line --.

Column 14, line 51, "packels" should be -- packets --.

Column 17, line 25, "-tp-" should be -- -to- --.

Column 18, line 30, "spplied" should be -- applied --.

Column 18, line 36, "ixage" should be -- image --.

Column 19, line 24, "filer" should be -- filter --.

Column 19, line 24, "harmonio" should be -- harmonic --.

Column 19, line 41, "pixe" should be -- pixel --.

Column 19, line 44, "lrace" should be -- trace --.

Column 20, line 18, "ine" should be -- line --.

Column 20, line 23, "regiser" should be -- register --.

UNITED STATES PATENT AND TRADEMARK OFFICE
CERTIFICATE OF CORRECTION

PATENT NO. : 4,656,520

DATED : April 7, 1987

INVENTOR(S) : Robert Norman Hurst

It is certified that error appears in the above-identified patent and that said Letters Patent is hereby corrected as shown below:

Column 20, line 25, "ine" should be -- line --.

line 36, "oddnumbered" should be -- odd-numbered --.

line 47, "seecting" should be -- selecting --.

line 50, "reatively" should be -- relatively --.

Signed and Sealed this

Tenth Day of January, 1989

Attest:

DONALD J. QUIGG

Attesting Officer

Commissioner of Patents and Trademarks